United States Patent

[11] 3,626,239

| [72] | Inventor | Eugene W. Brock<br>Anderson, Ind. |
| --- | --- | --- |
| [21] | Appl. No. | 40,092 |
| [22] | Filed | May 25, 1970 |
| [45] | Patented | Dec. 7, 1971 |
| [73] | Assignee | General Motors Corporation<br>Detroit, Mich. |

[54] HEADLAMP DEENERGIZATION DELAY SYSTEM
3 Claims, 1 Drawing Fig.

| [52] | U.S. Cl. | 315/83,<br>315/77, 315/79, 307/10 |
| --- | --- | --- |
| [51] | Int. Cl. | B60q 1/06,<br>B60q 1/08 |
| [50] | Field of Search | 315/82, 83,<br>76, 77, 78, 79; 340/322 |

[56] References Cited
UNITED STATES PATENTS

| 3,544,838 | 12/1970 | Carruth et al. | 315/83 |
| 3,389,296 | 6/1968 | Carruth | 315/77 |
| 3,392,352 | 7/1968 | White | 307/304 |

Primary Examiner—Herman Karl Saalbach
Assistant Examiner—Marvin Nussbaum
Attorneys—J. L. Carpenter and Paul Fitzpatrick ABSTRACT: A vehicle headlamp control circuit used in conjunction with the conventional vehicle headlamp control switch and comprising a relay in parallel with the headlamp switch, an RC charge storage and timed discharge network and a transistor switch controlled by the headlamp and vehicle ignition switches to cause the RC network to charge through the ignition switch and to discharge and actuate the relay to delay headlamp deenergization if and only if the headlamp switch is opened after the ignition switch is opened.

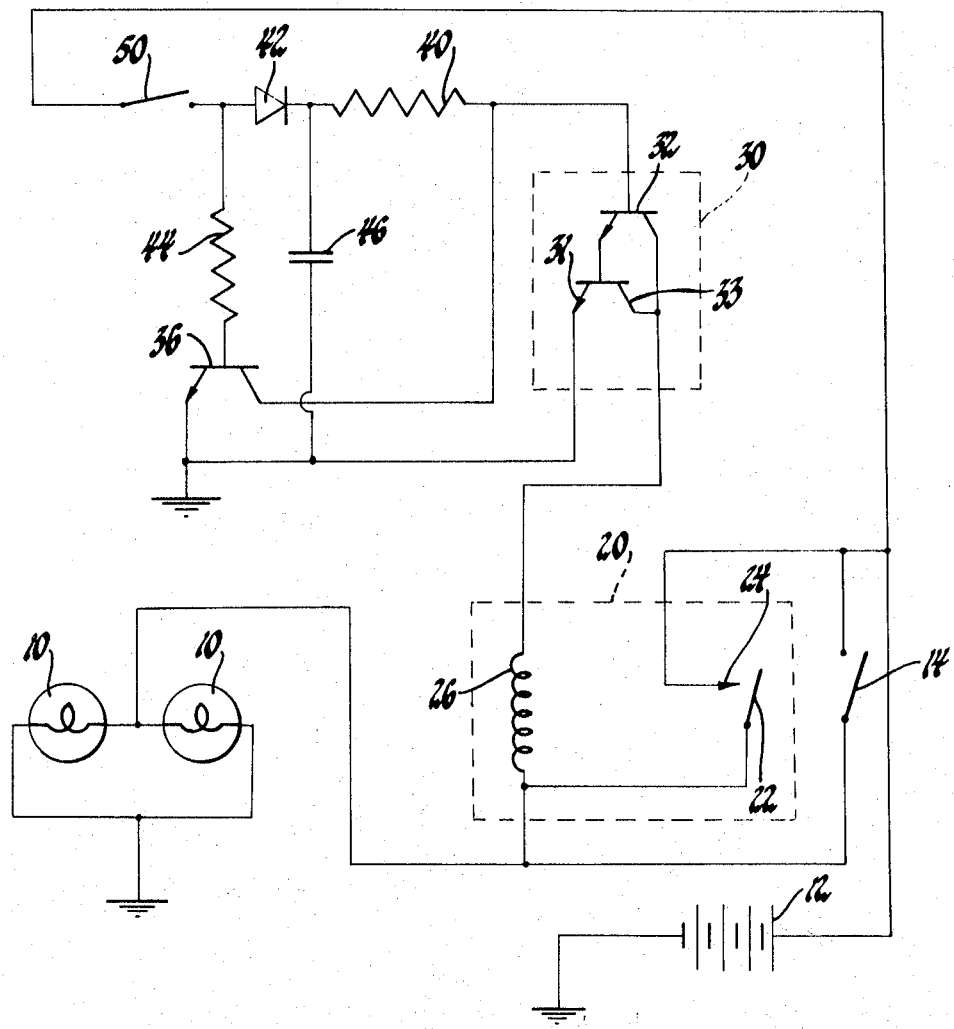

HEADLAMP DEENERGIZATION DELAY SYSTEM

My invention relates to control means for a lighting circuit and more particularly to time delay control means for the lighting circuit of an automotive vehicle which maintains certain lights energized for a period of time after the vehicle operator has turned all vehicle systems off and left the vehicle. This enables the operator to reach a remote point before total darkness engulfs the area.

It is a particular object of my invention to provide a simple, compact and inexpensive control circuit for vehicle headlamp deenergization delay which can be easily added to a conventional vehicle headlamp system.

It is a further object of this invention to provide such a control circuit that allows the vehicle operator to choose between normal or time delayed headlamp deenergization but does not require an extra selector switch for that purpose.

In its operation my control circuit makes use of the conventional ignition and headlamp power switches now in use on most vehicles. Assuming the vehicle has been operated with the headlamps on, when the operator reaches his destination he first stops the vehicle. If the operator turns off the headlamp switch with the ignition still on, the headlamps will be immediately deenergized. However, if the headlamps are turned off after the ignition switch has been opened, the headlamps will remain energized for the operator's convenience and be automatically deenergized some predetermined period after the opening of the ignition switch. These particular sequences of operation should be adapted to easily by most vehicle operators since they take advantage of the driver's natural tendency to turn off the headlamps before the ignition if one does not need them on and to turn off the headlamps after the ignition if one desires to keep them on.

My invention will be best understood by reference to the following specification and claims and the accompanying drawing, which illustrates a preferred embodiment of my invention but is not intended to limit its scope.

The FIG. is a circuit diagram of a time delay accessory headlamp control system embodying my invention.

In the conventional motor vehicle the headlamps 10 are energized from a source of current at approximately constant potential, such as the battery 12, through the headlamp switch 14. An electrically operated switch, such as relay 20, is connected with its main power circuit, which in this case consists of armature 22 and contact 24, in parallel with headlamp switch 14. Armature 22 and contact 24 must be capable of handling the full current drawn by headlamps 10. The relay 20 also includes actuator coil 26, one end of which is connected to the junction between the armature 22 and the headlamps 10. The other end of the coil 26 is connected to the collector of a transistor switch 30, in this case a Darlington transistor amplifier. The emitter 31 of the transistor switch 30 is connected to ground and the base 32 is connected through resistor 40 and reverse biased diode 42 to the accessory terminal of the ignition switch 50. A second transistor switch 36 has its collector connected to the base of transistor 30, its emitter grounded and its base connected through resistor 44 to the junction of diode 42 and the ignition switch 50. A capacitor 46 is connected from the junction of diode 42 and resistor 40 to ground. The ignition switch 50 connects diode 42 and resistor 44 with the ungrounded side of the vehicle battery.

Now the operation of the circuit will be described. When the vehicle operator decides to use his vehicle he first closes the ignition switch 50. This charges capacitor 46 through diode 42 to battery potential. It also supplies battery potential to the collector and emitter of transistor 36 through resistors 40 and 44, respectively. Transistor 36 is thus forced immediately into saturation. This causes the collector potential of transistor 36, which is also the base potential of transistor 30, to drop to a value near ground potential. Capacitor 46 remains fully charged, and most of the battery potential appears across resistor 40. To use the headlamps 10 the operator closes switch 14, which causes battery potential to be applied at the headlamps 10 and, through coil 26, to the collector 33 of transistor 30. However, transistor 30 remains cut off because of its depressed base potential. The circuit is in this state when the operator stops the vehicle and prepares to leave it.

If the operator wishes to immediately deenergize his headlamps, he first opens the headlamp switch 14. This removes battery potential from the collector of transistor 30. He then opens the ignition switch, which cuts off base current o transistor 36 and causes that transistor to cease conducting current. Capacitor 36 and causes that transistor to cease conducting current. Capacitor 46 then drives the base potential of transistor 30 upward to full battery potential; but transistor 30 does not begin to conduct, since the necessary potential is not present at its collector 33. Thus the headlamps are deenergized as soon as switch 14 is opened.

If the vehicle operator wishes, however, to delay the deenergization of his headlamps, he opens the ignition switch 50 with the headlamp switch 14 still closed. Transistor 36 is cut off by lack of base current, and the potential of the base 32 of transistor 30 rises. Since battery potential is supplied to the collector of transistor 30 through the switch 14 and the emitter 31 of transistor 30 is grounded, transistor 30 will start to conduct current. Current flow through coil 26 will cause armature 22 to close against contact 24, and a current path will be created in parallel with switch 14. Headlamp switch 14 may now be opened, and the relay armature 22 will supply current to the headlamps 10 and transistor 30. Since capacitor 46 is the only source of base current for transistor 30, when capacitor 46 is discharged transistor 30 will stop conducting, the relay armature 22 will open, and the headlamps 10 will be deenergized. Resistor 40 limits the discharge current from capacitor 46 and therefore determines, along with capacitor 46, the length of the time delay.

The headlamp control circuit that has been described is a new and useful device capable of being added onto the already existing headlamp control mechanism of a vehicle to provide delay headlamp deenergization when desired by the operator without the necessity of an extra switch. Of course the particular choice of components and circuit connections is for disclosure purposes and is not to be construed as limiting the scope of the invention.

I claim:

1. In a vehicle having both an ignition system energized by a grounded terminal power source in response to closure of an ignition switch and headlamps energized by the power source in response to closure of a light switch, apparatus for effecting immediate deenergization of said headlamps when said light switch is opened while said ignition switch is closed and for effecting delay deenergization of said headlamps when said light switch is opened after said ignition switch is opened comprising, in combination, means connecting said light switch and said headlamps in series with the power source; controlled switch means defining a low impedance current path in parallel with said light switch and having a control terminal, the current path being completed by said controlled switch means when substantially ground potential is applied to said control terminal whereby said headlamps are energized whenever said light switch is closed or said current path is completed; an energy storage device having a grounded terminal connected in series with said ignition switch and the power source whereby said storage device is charged by the power source when said ignition switch is closed; discharge means including the series combination of a resistor and a second controlled switch connected in parallel with said storage device for discharging said storage device, said second controlled switch being responsive to closure of said ignition switch whereby said discharge path is completed when said ignition switch is closed and interrupted when said ignition switch is open; and means responsive to the storage device charge and the second controlled switch for both discharging said storage device and applying substantially ground potential to said control terminal for a time determined by the discharge rate of said storage device when said discharge path is interrupted, ground potential thereby being applied to said control terminal for a predetermined time during which the headlamps remain energized when said light switch is opened after said ignition switch is opened.

2. In a vehicle having an ignition switch and headlamps controlled by a lamp switch, apparatus for effecting immediate deenergization of the headlamps by first opening the lamp switch and then opening the ignition switch and for effecting delayed energization of the headlamps by first opening the ignition switch and then opening the lamp switch comprising, in combination, a power source; means connecting the lamp switch in series with the headlamps and the power source; a controlled switch having a control terminal, the conductivity of the controlled switch being established by the potential on the control terminal, for completing a low impedance current path in parallel with the lamp switch whereby the headlamps are energized whenever the current path is completed or the lamp switch is closed, the controlled switch effecting completion of the current path when the control terminal is substantially at ground potential; an energy storage device having one terminal grounded; means connecting the ignition switch in series with the power source and the storage device whereby the device is charged through the ignition switch when the ignition switch is closed; discharge means responsive to the ignition switch for discharging the capacitor when the ignition switch is closed, the discharge means including a grounded controlled switch and a resistor connected in parallel with the storage device; and a semiconductor switch connected between the control terminal and ground for grounding the control terminal, the semiconductor switch also having a control terminal connected to the discharge means for draining energy from the storage device when the discharge path is interrupted by opening of the ignition switch, the control terminal of the first controlled switch thereby being grounded so as to maintain the headlamps energized for a predetermined time when the ignition switch is opened before the lamp switch is opened.

3. Apparatus for controlling the energization of a vehicle's headlamps comprising, in combination, a power source having a grounded terminal; a light switch connected in series with the power source and the headlamps; a relay including both a set of normally open contacts that are connected in parallel with the light switch and a winding connected at one end to the connection between the light switch and the headlamps whereby the headlamps are energized by the power source whenever the light switch is closed or the winding is energized; a capacitor having a grounded terminal; an ignition switch connected in a series circuit with the capacitor and the power source whereby the capacitor is charged by the power source when the ignition switch is closed; discharge means including a controlled switch defining a discharge path for the capacitor and a resistor for limiting the discharge rate of the capacitor, the controlled switch being responsive to the ignition switch whereby the discharge path is closed when the ignition switch is closed and opened when the ignition switch is open; and a second controlled switch connected between the other end of the winding and ground, the second controlled switch having a control mechanism connected to the junction between the first controlled switch and the resistor whereby the second controlled switch provides a second discharge path through the resistor for discharging the capacitor and connects the winding to ground when the capacitor is charged, thereby effecting energization of the winding and the headlamps for a predetermined time after the lamp switch is opened following opening of the ignition switch.

* * * * *